United States Patent [19]

Zierhut

[11] Patent Number: 4,670,655

[45] Date of Patent: Jun. 2, 1987

[54] ALARM APPARATUS FOR SPATIAL SURVEILLANCE

[75] Inventor: Hermann Zierhut, Munich, Fed. Rep. of Germany

[73] Assignee: Richard Hirschmann Radiotechnisches Werk, Esslingen, Fed. Rep. of Germany

[21] Appl. No.: 750,155

[22] Filed: Jul. 1, 1985

[30] Foreign Application Priority Data

Jun. 30, 1984 [DE] Fed. Rep. of Germany ....... 3424135

[51] Int. Cl.[4] .............................................. G01J 5/08

[52] U.S. Cl. .................................... 250/342; 250/353

[58] Field of Search ........... 250/342, 353, 349, 338 R, 250/221; 340/567, 600

[56] References Cited

U.S. PATENT DOCUMENTS

| | | | |
|---|---|---|---|
| 3,631,434 | 12/1971 | Schwartz | 340/567 |
| 3,958,118 | 5/1976 | Schwartz | 250/221 |
| 4,087,688 | 5/1978 | Keller | 250/342 |
| 4,495,416 | 1/1985 | Mason et al. | 250/338 |
| 4,529,874 | 7/1985 | Zierhut | 250/221 |

FOREIGN PATENT DOCUMENTS

| | | | |
|---|---|---|---|
| 0080114 | 11/1982 | European Pat. Off. | |
| 2836462 | 3/1980 | Fed. Rep. of Germany | 340/600 |
| 2653110 | 8/1981 | Fed. Rep. of Germany | |
| 3128256 | 2/1983 | Fed. Rep. of Germany | |

*Primary Examiner*—Janice A. Howell
*Assistant Examiner*—Constantine Hannaher
*Attorney, Agent, or Firm*—Robert J. Koch

[57] ABSTRACT

An alarm system for the surveillance of space, with at least one sensor of electromagnetic, in particular infrared radiation, located on the closed inner frontal surface of a rectangular tube having mirror surfaces on its internal surfaces, the use of focusing means, such as lenses, concave mirrors, objectives, and the like, is avoided by that the sensor is essentially adjacent at least in one direction to the opposing mirror surfaces. This yields an alarm system that is highly compact, has small dimensions, and may be produced cost effectively. The sensor preferably consists of two spaced apart sensor elements operated in a push-pull mode.

23 Claims, 4 Drawing Figures

ALARM APPARATUS FOR SPATIAL SURVEILLANCE

BACKGROUND OF THE INVENTION

1. Field of the Invention

The invention relates to an alarm apparatus for spatial surveillance. In particular the invention includes an alarm apparatus with at least one sensor for electromagnetic radiation, in particular infrared radiation, and a tube with a rectangular cross section and open on one frontal surface. At least two opposing internal surfaces of the tube are mirror surfaces and the sensor is arranged in an axially symmetrical manner on the closed frontal internal surface.

2. Description of the Prior Art

Alarm systems are known for example from West German published Application No. 2653110. The radiation incident through the open frontal surface of the tube and to be reflected is bundled by optical means, for example a lens, and focused by the mirror surfaces provided inside the tube on the sensor. The sensor is small compared to the closed frontal surface and it is spaced apart far from the edges of the closed frontal surface, i.e., the mirror surfaces bordering the closed frontal surfaces.

Known alarm systems, such as those described for example in European Application No. 0080114, use concave mirrors, segment mirrors and other types of expensive optical devices to focus the incident radiation onto a sensor.

The known alarm systems of this type are not cost effective in view of their use of optical devices to bundle the incident radiation and cannot be produced with small dimensions. In particular with alarm systems to be employed for the surveillance of rooms, small dimensions of the instruments are especially important.

SUMMARY OF THE INVENTION

It is therefore an object of the invention to provide an alarm apparatus which is able to perform without additional optical means, such as lenses, concave mirrors or objectives for the bundling of incident radiation and which may be manufactured in small sizes and in a cost effective manner.

The characteristic according to the invention is that the sensor surface is virtually increased in the direction perpendicular to two opposing mirror surfaces. This is accomplished by choosing the dimensions of the sensor and/or the tube or the closed internal surface of the tube so that the sensor essentially occupies the entire length of the closed frontal inner surface of the tube bounded by two opposing mirror surfaces. Practically all of the radiation incident in this direction therefore arrives by means of the mirror effect on the sensor, without requiring special optical means to focus the said radiation.

The alarm apparatus according to the invention is particularly suitable for small, compact alarm systems to monitor rooms, especially in dwelling areas. Such instruments are manufactured in small sizes and may be built into in already existing objects, such as clocks or the like, and thus installed inconspicuously and without interference. Furthermore, surveillance systems of this type are affordable by wide segments of the population in view of their cost effective configuration.

If the sensor fills the closed frontal internal surface not only in one direction, for example the vertical or horizontal direction, i.e., the X or Y direction, but in both planes or directions, a continuous lobe or a continuous cone is obtained for the detector or receiving characteristic. However, in view of the response behavior and interference safety to prevent false alarms, receiving characteristics with receiving or detector segments are mor favorable. An embodiment of the invention takes this into account by dimensioning the sensor in a rectangular or strip form, thereby filling essentially the entire intermediate space on the closed internal frontal surface of the tube between the opposing mirror surfaces in one direction, for example the vertical or Y direction only, while filling in the direction perpendicular to said first direction, i.e., the horizontal or X direction, only a part, preferably a quarter to one-half, of the space between two further opposing mirror surfaces on the closed internal frontal surface. This yields a segmented or strip shaped receiving area, with the areas detected by the alarm system and those not detected alternating, in the present example, in the horizontal or X direction.

The tube may be rectangular or square, depending on conditions and applications.

According to an embodiment of the invention the sensor comprises two spaced apart sensor elements to be operated in a push-pull mode, such as those known in themselves from West German published Patent Application No. 3128256, the disclosure of which is incorporated by re With the use of such a sensor comprising two sensor elements, the elements again filling in one of their directions, for example the vertical or Y direction, essentially the entire intermediate space between two opposing mirror surfaces, while in the other direction, perpendicular to said first direction, a distance is maintained between the sensor elements and the opposing mirror surfaces. This results in disk shaped segments alternating with respect to the two sensor elements, as set forth in detail below.

According to one embodiment, the opposing mirror surfaces are parallel to each other. In certain applications it is, however, advantageous to have the opposing mirror surfaces include an angle in relation to the center axis, i.e., they are arranged in a divergent or convergent manner. In the case of a mirror layout converging toward the closed frontal inner surface of the tube, a larger inlet orifice is obtained with identical dimensions of the inner frontal surfaces, while the solid angle and thus the sensitivity of the alarm system is increased. If, in contrast, it is desired to monitor a certain area, i.e., a smaller specific angle, only and keep adjacent areas outside the detector effect of the alarm system, it may be advantageous in certain cases to place the mirror surfaces at an angle to the center axis, such that the mirror surfaces are converging toward the open frontal surface of the tube.

Opposing mirror surfaces may be placed at an angle in relation to the center axis by means of an appropriate inclination of the tube wall, by a corresponding continuous variation of the tube wall thickness or by wedges applied to the wall of the tube.

According to a further preferred form of embodiment of the invention it is also possible to provide means, for example screw assemblies, whereby the angle of opposing mirror surfaces with respect to the center axis may be varied and thus adapted to certain applications.

According to another preferred form of embodiment of the invention the adaptability and flexibility of the alarm system according to the invention may be increased further by the use of a telescoping tube, whereby the length of the tube is adjustable.

It is further advantageous to manufacture the tube of the purest aluminum possible, so that the internal surfaces of the tube themselves may serve as the mirror surfaces and the application of mirror surfaces to the inner surfaces of the tube is elminated. The aluminum tube is preferably extruded.

In regard to the manufacture and durability of the apparatus, an embodiment of the alarm system according to the invention is particularly advantageous, wherein the tube, the front wall carrying the sensor elements on its frontal surface and an airtight radiation permeable window mounted at the radiation inlet orifice of the tube, form a hermetically sealed housing. The alarm system in the form of such an airtight assembly is highly durable, as the partially sensitive mirror surfaces are not exposed to the air of the environment. The internal space of the airtight housing core may be filled further with an inert protective gas. In view of the hermetic seal of the system, it is further possible to use materials for the mirror surfaces which would have only a short life in an open tube, due to the effect of the atmosphere. The sensor or the sensor elements are integrated into the housing and are also protected against contamination. The radiation permeable window, for example a germanium window, customarily present in commercially available detectors, may be eliminated in this embodiment, or it may simultaneously serve as the seal against the air, so that in this case the detector is integrated into the alarm system.

The housing may consist of a galvanically metal coated synthetic plastic housing or an extruded metal part that may be produced in a particularly cost effective manner.

In an especially cost effective embodiment of the alarm system, the tube has a square cross section with internal edge lengths of 2 to 4, preferably 3 mm. The length of the tube is preferably 10 to 30 mm, in particular 20 mm.

The invention will become more apparent by the description of an example below, with reference to the drawings.

DESCRIPTION OF THE PREFERRED EMBODIMENT

Figure 1:
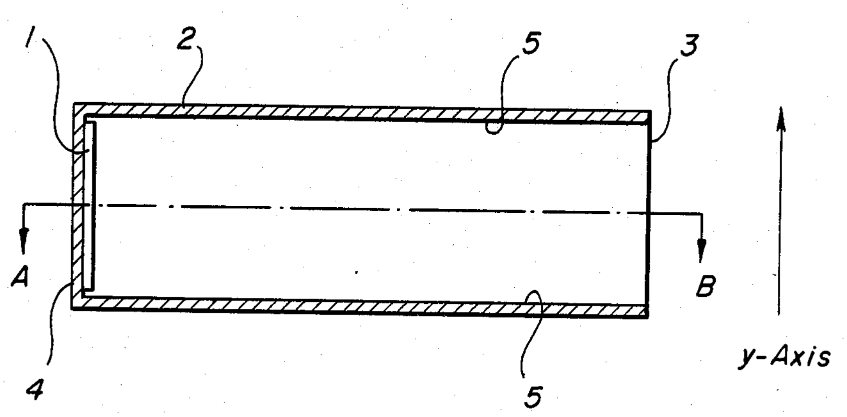
FIG. 1 is an embodiment of the alarm system according to the invention in a schematic cross-sectional view.
Figure 2:
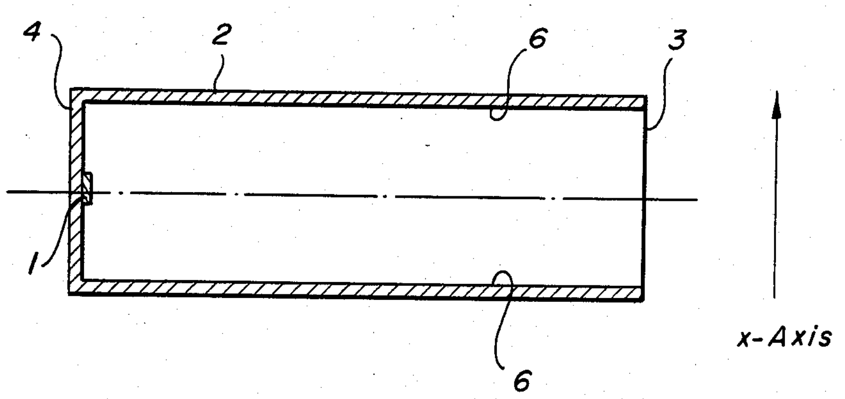
FIG. 2 is a cross section of the alarm system according to the invention on the line A-B in FIG. 1.
Figure 3:
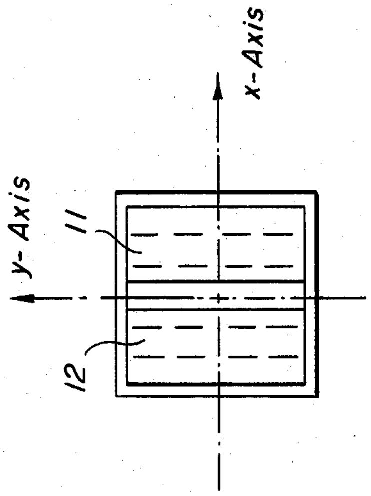
FIG. 3 is a top view of the closed inner frontal surface of the tube from the direction of the open frontal surface and FIG. 4 is a schematic view of the beam path in a further embodiment of the invention.

According to FIGS. 1 to 3, a sensor 1 is located in axial symmetry on the inner frontal surface 4 of a tube 2. The open frontal surface 3 of the tube 2 is the inlet surface for the radiation to be detected by the sensor 1. In the embodiment shown, the tube has a square cross section. The opposing internal surfaces of the tube serve as the mirror surfaces 5. The tube may be made for example of pure aluminum so that no additional treatment of the inner surfaces is necessary to obtain the mirror effect.

As shown in FIGS. 1 and 2, the sensor is in the form of strips and is mounted on the inner frontal surface 4 of the tube 2 in an axially symmetrical manner. In the longitudinal direction of the sensor 1, i.e., the direction of the Y axis or the vertical direction, the dimension of the sensor essentially corresponds to the distance between the opposing mirror surfaces 5, i.e., the short edges of the sensor 1 are essentially adjacent to the mirror surfaces 5. Due to the mirror effect of the mirror surfaces 5, in the Y direction a theoretically infinite virtual sensor strip range is obtained for the radiation entering through the open frontal surface 3, so that in this vertical strip segment, the width of which corresponds to the width of the sensor strip 1, all of the radiation of an object is detected.

The radiation incident on the sensor 1 is reduced as an inverse function of the angle of incidence with respect to the center axis. Due to the geometrical conditions and the reduction in radiation intensity due to the mirror effect, consequently, if the inner surfaces of the tube located parallel to the Y axis and perpendicular to the X axis, are not mirrors, the detector characteristic of the embodiment shown in FIG. 1 is in the form of a segment disk parallel to the Y axis or vertical direction, with a width corresponding to the width of the sensor strip.

In the case where the internal tube surfaces are also mirror images, additional fan shaped segment disks are obtained, as the sensor strips 1 in FIG. 2 are virtually repeated by virtue of the mirror surfaces perpendicular to the Y axis, in the X axis.

Figure 4:
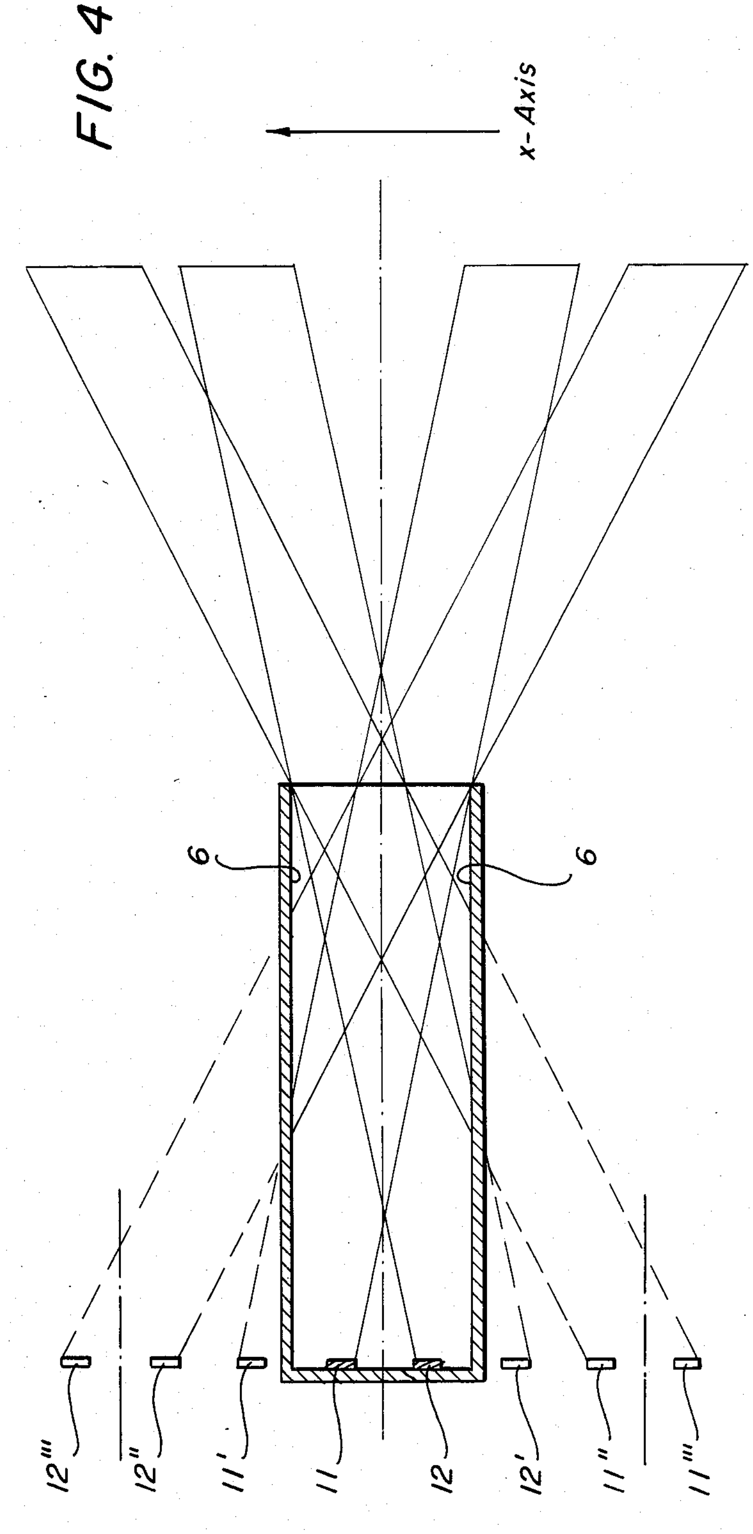

In FIGS. 3 and 4, an embodiment is illustrated schematically which employs a sensor comprising two spaced apart sensor elements 11, 12, operated in a push-pull mode. The receiving characteristic in the Y or vertical direction correspond to the characteristic explained in connection with FIG. 1, i.e., vertical segment disks are obtained in the Y or vertical direction. In the X or horizontal direction, due to the mirror effect applied by the mirror surfaces 6 in the X or horizontal direction, alternating segment disks are obtained, which are repeated at rising distances from the center axis. The virtual images 11′, 11″, 11‴ and 12′, 12″, 12‴ are repeated correspondingly in the X or horizontal direction at further distances from the center axis, in an appropriate sequence.

The evaluation of the sensor signals is effected by means of known signal evaluation circuits, which are not part of the present invention and therefore are not shown or described. In regard to the evaluation of the sensor signals in the application shown in FIG. 4, reference is made for example to West German No. 3128256.

What is claimed is:

1. An alarm apparatus for spatial surveillance comprising at least one sensor means for sensing electromagnetic radiation, a tube with a rectangular cross section wherein said tube is open at one frontal surface, has a first mirrored inner surface and a second mirrored inner surface wherein said first and second inner surfaces are opposing surfaces and a closed inner frontal surface, said sensing means is positioned in an axially symmetric manner such that the sensor occupies in a first direction or Y axis essentially the entire length bounded by the two opposing mirror surfaces of the closed inner frontal surface of the tube.

2. The alarm apparatus of claim 1 wherein said electromagnetic radiation is infraed radiation.

3. The alarm apparatus of claim 1 further comprising a third and a fourth mirrored inner surface, said third and fourth surfaces are opposing surfaces and wherein said sensor means occupies only a part of the length bounded by the third and fourth inner surfaces in a second direction or X axis perpendicular to said first direction.

4. The alarm apparatus of claim 3 wherein said sensor means comprises two spaced apart sensor elements operated in a push-pull mode.

5. The alarm apparatus of claim 3 wherein said opposing inner surfaces are parallel to each other.

6. The alarm apparatus of claim 3 wherein said opposing mirror surfaces are placed at an angle with respect to the axis of the tube.

7. The alarm apparatus of claim 6 wherein said angle is variable.

8. The alarm apparatus of claim 3 wherein said tube is a telescoping tube.

9. The alarm apparatus of claim 3 wherein said tube is made of aluminum.

10. The alarm apparatus of claim 9 wherein said aluminum tube is extruded.

11. The alarm apparatus of claim 3 wherein the tube, the surface carrying said sensor means on the frontal inner surface, and an airtight radiation permeable window located on the open front wall of the tube, form a housing hermetically sealed to the outside.

12. The alarm apparatus of claim 11 wherein the housing is a galvanically metal coated synthetic plastic housing.

13. The alarm apparatus of claim 11 wherein the housing is a metal extrusion.

14. The alarm apparatus of claim 2 wherein said sensor means comprises two spaced apart sensor elements operated in a push-pull mode.

15. The alarm apparatus of claim 2 wherein said opposing inner surfaces are parallel to each other.

16. The alarm apparatus of claim 2 wherein said opposing mirror surfaces are placed at an angle with respect to the axis of the tube.

17. The alarm apparatus of claim 16 wherein said angle is variable.

18. The alarm apparatus of claim 2 wherein said tube is a telescoping tube.

19. The alarm apparatus of claim 2 wherein said tube is made of aluminum.

20. The alarm apparatus of claim 19 wherein said aluminum tube is extruded.

21. The alarm apparatus of claim 2 wherein the tube, the surface carrying said sensor means on the frontal inner surface, and an airtight radiation permeable window located on the open front wall of the tube, form a housing hermetically sealed to the outside.

22. The alarm apparatus of claim 21 wherein the housing is a galvanically metal coated synthetic plastic housing.

23. The alarm apparatus of claim 21 wherein the housing is a metal extrusion.

* * * * *